May 28, 1963   R. C. WEBSTER   3,091,114
METHOD AND APPARATUS FOR TESTING SEALED PACKAGES FOR LEAKS
Filed Dec. 17, 1959
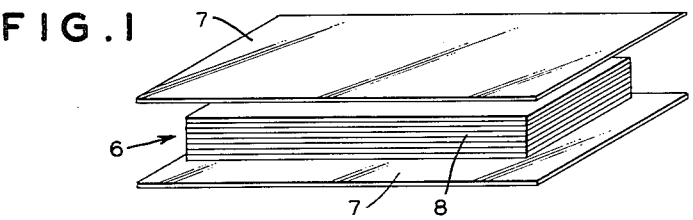
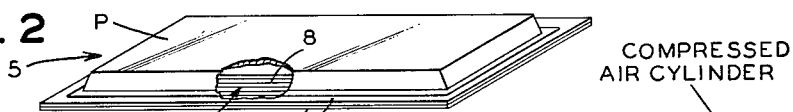
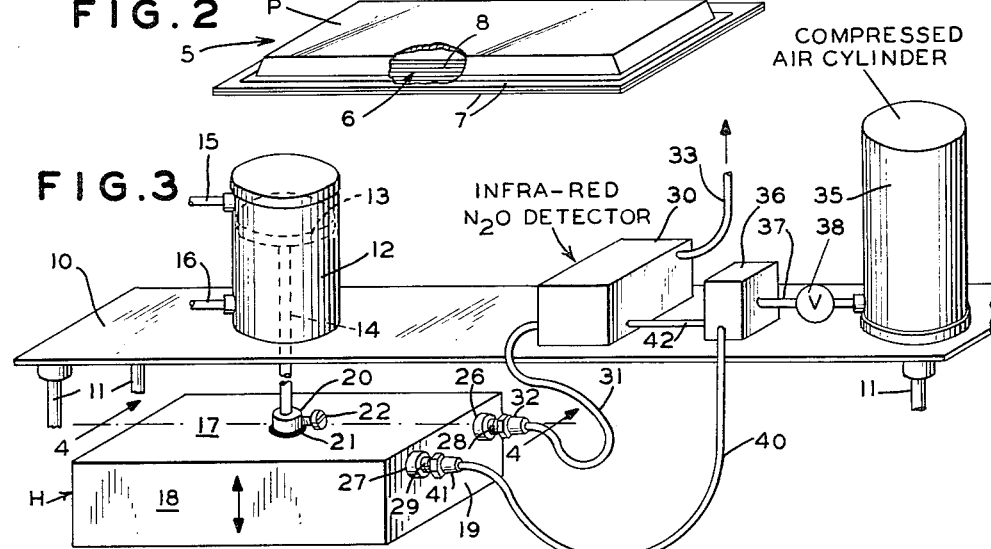
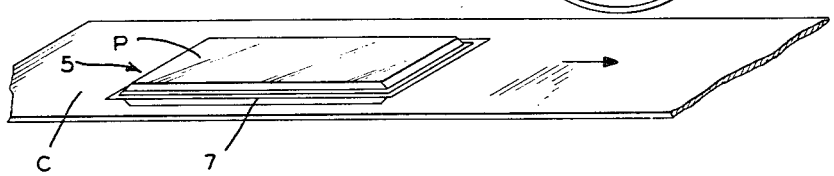
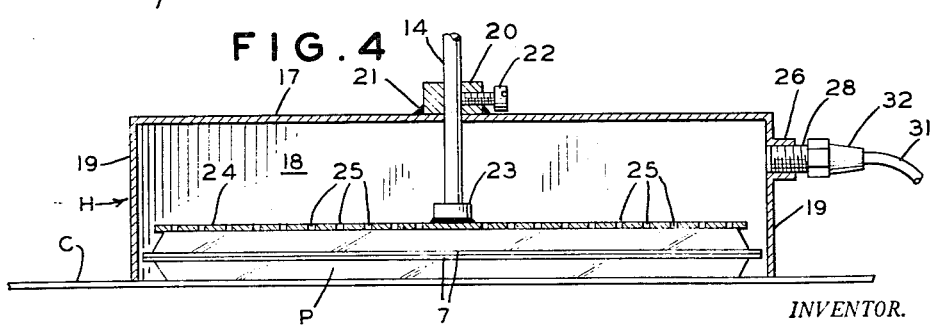
INVENTOR.
ROBERT C. WEBSTER
BY
Milford F. Tietze
AGENT

United States Patent Office 3,091,114
Patented May 28, 1963

3,091,114
METHOD AND APPARATUS FOR TESTING SEALED PACKAGES FOR LEAKS
Robert C. Webster, Madison, Wis., assignor to Air Reduction Company, Incorporated, New York, N.Y., a corporation of New York
Filed Dec. 17, 1959, Ser. No. 860,203
6 Claims. (Cl. 73—49.3)

This invention relates generally to the art of leak detection and, more particularly, to an improved method of testing sealed packages for leaks and to apparatus for readily and economically carrying out the method. The invention pertains, in one of its more specific aspects, to an improved and simplified method of making and testing a sealed package which includes a receptacle comprising a flexible, deformable, fluid impermeable sheet material, whereby to ascertain whether any leaks exist in the receptacle.

The invention has wide application and may be advantageously employed in testing various types of sealed packages for leaks. It is primarily concerned and particularly applicable to the detection of leaks in a sealed package which comprises a readily deformable receptacle, a selected product and a quantity of a nitrous oxide-containing inert gas, both the product and the gas being contained within the receptacle.

The principal object of the invention is to provide an improved method and apparatus for testing a sealed package for leaks.

Another object of the invention is to provide an economical and dependable method of determining whether a package, which is intended to be hermetically sealed and devoid of leaks, is in fact properly sealed and leak free.

The invention has for another object the provision of a simplified method for readily determining the presence of leaks in a sealed package which includes a receptacle consisting of a flexible, deformable, fluid impermeable sheet material, without damaging the receptacle.

A further object of the invention is to provide apparatus of the character indicated which is sturdy and durable in construction, which is reasonable in manufacturing, operating and maintenance costs and which is capable of performing its intended functions in a dependable and trouble-free manner.

My instant invention is especially concerned with the detection of any leaks that may exist in a sealed package of the character indicated, wherein the receptacle of the package is made from a relatively thin, flexible, deformable, fluid impervious sheet material. The preferred sheet material of the receptacle is any suitable synthetic thermoplastic resinous composition having the indicated properties and capable of being economically fabricated, formed into a receptacle of desired configuration and then heat sealed. Among the presently available synthetic compositions which are suitable for the purposes of this invention are cellophane that has been coated with wax and rubber and laminates of polyvinylidene chloride that are made and marketed by Dow Chemical Company under the trademark "Saran."

The package to be tested may contain any desired product, including, but not limited to, food items, such as cheeses and the like. The detailed description of the invention appearing further along herein is directed to application of the invention to the making and testing of sealed packages containing cheese, by way of illustration.

As was indicated earlier herein, the receptacle also contains an inert gas comprising nitrous oxide. Any suitable inert gas or mixture of gases, containing nitrous oxide as an ingredient, may be used, providing that the same will not be detrimental to the contents of the package, whether food or other items. The preferred gas consists essentially of a first gas selected from the group consisting of carbon dioxide, nitrogen and a mixture of carbon dioxide and nitrogen and a second gas consisting of nitrous oxide.

The amounts of these gases consists, on a weight basis, from 75 to 99% of the first gas and from 1 to 25% of the second gas. The preferred gas composition contains, on a weight basis, 97% of the first gas and 3% of the second gas.

Nitrous oxide is an important ingredient of the inert gas mixture. This is an extremely stable oxide of nitrogen and is prepared commercially by the thermal decomposition of ammonium nitrate at a temperature of about 464° F. according to the reaction:

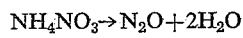

$$NH_4NO_3 \rightarrow N_2O + 2H_2O$$

Nitrous oxide affords a number of important advantages in the practice of this invention, including:
(1) It is non-toxic.
(2) It does not adversely affect the flavor of food products when used in the amounts indicated above in the inert gas mixture.
(3) It is non-corrosive, when used as contemplated by this invention.
(4) It may be readily detected in small or even minute quantities by commercially available infra-red gas analyzers.
(5) It is relatively inexpensive in the amounts required per package.

A preferred and recommended method of making and testing a sealed package according to this invention comprises first forming the package by introducing a selected product and an inert gas into a receptacle and heat sealing the receptacle with the product and gas therein. The inert gas consists essentially of a first gas selected from the group consisting of carbon dioxide, nitrogen and a mixture of carbon dioxide and nitrogen and a second gas consisting of nitrous oxide. The receptacle preferably consists of a thin, flexible, deformable, fluid impermeable thermoplastic sheet material. The package is placed in a closed zone which envelops an atmosphere that is devoid of nitrous oxide. The package is then "squeezed" by being subjected to an externally applied pressure that is greater than the pressure existing in the closed zone. If there are any leaks in the receptacle, this causes the inert gas, including nitrous oxide, to be discharged from the receptacle into the closed zone exterior of the receptacle. Immediately following application of the external pressure to the package, the gas in the closed zone exterior of the package is analyzed for the presence of nitrous oxide to thereby determine whether any leaks exist in the receptacle.

It is essential in practicing this invention that a differential pressure be developed between the interior of the package and the region of the closed zone exterior the package. A differential pressure is necessary to cause at least some of the inert gas in the package to be discharged through any leaks that exist in the material of the receptacle and then analyzed for nitrous oxide. To this end, a positive pressure is preferably produced within the package which is greater than the normal pressure therein. While the package may be subjected to a negative pressure, instead of being subjected to an internal positive pressure, by creation of a partial vacuum in the closed zone, this is not believed to be as advantageous in view of the time required and the possibility of damaging the receptacles of sound packages during testing.

The enumerated objects and other objects, together with the advantages obtainable by the practice of this invention, will be readily understood by persons versed in the art from the following detailed description and the accompanying drawing which respectively describe and illustrate a package and a preferred arrangement of apparatus for testing the package for leaks in accordance with the invention.

In the drawing, wherein like reference characters denote corresponding parts throughout the several views:

FIG. 1 is an isometric view of certain parts used in making a package to be tested and shows the relative position thereof in the course of forming the package;

FIG. 2 is an isometric view of the completed package;

FIG. 3 is an isometric view of apparatus for detecting any leaks that may exist in the receptacle of the package shown in FIG. 2; and FIG. 4 is a view in enlargement taken along line 4—4 of FIG. 3 and illustrating the parts in another relative position.

Referring initially to FIG. 2, I have illustrated therein a package P which is to be tested for leaks and which comprises a receptacle 5 and product 6 (FIG. 1) within the receptacle. The receptacle is made up of a pair of thin, flexible, deformable, fluid impermeable sheets 7 of an appropriate thermoplastic material. Product 6 consists of a stack of rectangular slices of cheese 8 which are of like size.

In the course of making the package, the facing marginal portions of thermoplastic sheets 7 are brought together and heat sealed to obtain a hermetically sealed receptacle 5 with the product 6 contained therein. The completed package P contains an inert gas in addition to the product 6. This gas preferably consists, on a weight basis, of 97% carbon dioxide and 3% nitrous oxide. The inert gas is admitted into the receptacle in any manner known to the art, prior to completing the sealing thereof.

The pressure of the inert gas within the receptacle at the time sealing is completed may be atmospheric or, as is preferred, slightly above atmospheric, i.e., within the range of 1 to 3 pounds per square inch gauge.

The apparatus includes a first support which comprises a flexible, imperforate, belt conveyor C, the illustrated portion of which is disposed horizontally and is movable toward the right, as indicated by the arrow. The apparatus also includes a second support consisting of a stationary platform 10 that is maintained above and in spaced relation to the conveyor by a plurality of posts 11. A hydraulic cylinder 12 is mounted on the platform and is equipped with a vertically reciprocable piston 13. Secured to and projecting downwardly from the piston is a piston rod 14 which extends through and below the bottom wall of cylinder 12 and platform 10. The cylinder is connected to a pair of conduits 15 and 16, conduit 15 communicating with the interior of the cylinder above the piston and conduit 16 communicating with the interior of the cylinder below the piston. These conduits are adapted to transmit and withdraw water or other suitable liquid under pressure into and from the cylinder whereby to impart reciprocation to the piston in the usual manner.

A hood unit H is positioned between the platform and the conveyor and is secured to and reciprocable with the piston rod and the piston. The hood unit includes a top wall 17, a pair of parallel side walls 18 and a pair of parallel end walls 19. The hood unit is open at its lower end, as shown in FIG. 4. A collar 20 is positioned centrally on top wall 17 and is rigidly secured thereto, preferably by welding, as indicated at 21. Piston rod 14 extends through collar 20 and an aligned opening in top wall 17. The piston rod is adjustably secured to the hood unit by a set screw 22 which is carried by collar 20.

The lower end of the piston rod is affixed to a bearing member 24 by a connector unit 23. The bearing member preferably consists of a planar plate 24 which is normal to the axis of the piston rod and is provided with a plurality of perforations 25. The lower face of plate 24 should at all times be located above the bottom or open end of the hood unit. The distance between the plate and the bottom of the hood unit is determined by the thickness of package P which is to be tested. This distance may be readily adjusted through the medium of set screw 22 and should be slightly less than the thickness of the package.

One of the hood end walls 19 is provided with a pair of internally threaded stub conduits 26 and 27 which establish communication between the exterior and interior of the hood unit. Conduit 26 is provided with a nipple 28 while conduit 27 is provided with a like nipple 29.

Positioned on platform 10 is an instrument 30 for detecting the presence of nitrous oxide in gas that is admitted thereto. This instrument is preferably an infrared detector that is adapted to receive and analyze relatively small amounts of nitrous oxide. Instrument 30 is connected to nipple 28 by a flexible conduit 31 and a fitting 32. Gas that is transmitted to instrument 30 from the hood unit is discharged from the instrument through a conduit 33.

Also positioned on platform 10 are a cylinder 35, containing compressed air or other suitable gas for flushing the interior of the hood unit, and a unit 36 for controlling discharge of compressed air from the cylinder in response to operation of instrument 30. Cylinder 35 communicates with unit 36 by way of a conduit 37 having a series-connected manual control valve 38. Unit 36 and conduit 37 communicate with the interior of the hood unit by way of a flexible conduit 40 which is coupled to nipple 29 by a fitting 41. Unit 36 is operatively connected to instrument 30 by a connector 42.

For the purpose of outlining the operation of the illustrated arrangement of apparatus in testing a package P for leaks, it is assumed that the package is placed on belt conveyor C directly beneath the hood unit and that the parts are in the relative position shown in FIG. 3. It is also assumed that the atmosphere surrounding the package and within the hood is devoid of nitrous oxide. Hydraulic fluid under pressure, from a suitable source (not shown), is introduced into cylinder 12 above piston, 13 and urges the piston, piston rod 14 and the hood unit H downwardly from the position shown in FIG. 3 to that shown in FIG. 4. This causes plate 24 to bear against the upper surface of package P and exert a positive pressure against the package. At the same time, the open end of the hood unit circumscribes the package and bears against the upper surface of conveyor C, thereby defining a closed zone with the conveyor. The pressure exerted by plate 24 on the package will depend on the configuration of the package and the material of the package receptacle. This pressure should be sufficient to force inert gas, including nitrous oxide, outwardly through any leaks that may exist in the receptacle material without damaging the material of the receptacle or the product contained therein. Gas in hood unit H is continuously or intermittently analyzed by infra-red detecting instrument 30. If no nitrous oxide is evolved during testing of a particular package, instrument 30, of course, indicates that the gas admitted thereto is free of nitrous oxide. If the gas within the hood unit contains nitrous oxide that is discharged from a particular package during testing, the presence of such nitrous oxide will be indicated by instrument 30 and the package should be discarded or reformed with a new receptacle.

The interior of the hood unit is purged by flushing with compressed air from cylinder 35 to remove traces of nitrous oxide after instrument 30 indicates that leaks exist in a particular package. Transmission of compressed air from the cylinder to the hood unit is controlled by unit 36 which, as indicated earlier, is responsive to operation of infra-red detecting instrument 30. Unit 36 may be of any desired construction capable of performing the indicated function. It may be electromechanical and include an electromagnet or similar device that is actuated in response to operation of instrument 30 to control flow of compressed gas from cylinder 35 to hood unit H. The interior of the hood unit may, if desired, be flushed after each test regardless of whether instrument 30 indicates that leaks exist in a particular receptacle.

The infra-red method of detection, as exemplified by the use of instrument 30, is well known and utilizes the ability of nitrous oxide to absorb radiation in the infrared spectra. Detecting instrument 30 need not be described in detail here since it embodies a generally well known construction. Among the suitable commercially available infra-red detecting instruments is one manufactured and marketed by Perkin-Elmer Corp., Norwalk, Connecticut.

It will be appreciated that various changes may be made in the above-described method and apparatus without departing from the invention or sacrificing any of its advantages. Accordingly, it is to be understood that all matter contained herein shall be interpreted as being illustrative and explanatory rather than in a limiting sense. For example, hood unit H may be of a size and construction that is capable of accommodating a plurality of packages instead of a single package, as shown, and cooperate with other parts in simultaneously testing all such packages for leaks.

I claim:
1. In apparatus for detecting leaks in the sealed receptacle of a package which includes a product and an inert gas comprising nitrous oxide that are contained in the receptacle, said receptacle comprising a flexible, deformable, fluid impermeable sheet material, the combination comprising support means, a hood unit carried by the support means and movable toward and away from a selected part of the support means, said hood unit being open at one end, said hood unit including a bearing member within its confines and spaced from its open end, said package being adapted to be positioned in the open end of the hood unit between said selected part of the support means and the bearing member, said part of the support means and the bearing member being adapted upon predetermined movement of the hood unit toward said part of the support means to apply sufficient pressure to the package to effect discharge of inert gas from the interior of the receptacle through any leaks that may exist in the receptacle, and means communicating with the interior of the hood unit for detecting the presence of nitrous oxide in gas admitted into the hood unit.

2. In apparatus for detecting leaks in the sealed receptacle of a package which includes a product and an inert gas comprising nitrous oxide that are contained in the receptacle, said receptacle comprising a flexible, deformable, fluid impermeable sheet material, the combination comprising support means, a hood unit carried by the support means and movable toward and away from a selected part of the support means, said hood unit being open at one end, said hood unit including a bearing member within its confines and spaced from its open end, said package being adapted to be positioned in the open end of the hood unit between said selected part of the support means and the bearing member, said part of the support means and the bearing member being adapted upon predetermined movement of the hood unit toward said part of the support means to apply sufficient pressure to the package to effect discharge of inert gas from the interior of the receptacle through any leaks that may exist in the receptacle, means communicating with the interior of the hood unit for detecting the presence of nitrous oxide in gas admitted into the hood unit, and means responsive to operation of the last-mentioned means for flushing the interior of the hood unit with a gaseous composition that is devoid of nitrous oxide.

3. In apparatus for detecting leaks in the sealed receptacle of a package which includes a product and an inert gas comprising nitrous oxide that are contained in the receptacle, said receptacle comprising a flexible, deformable, fluid impermeable sheet material, the combination comprising support means, including a first support and a second support, said package being adapted to be placed on the first support, a hood unit carried by the second support above the first support and movable upwardly and downwardly relative to the second support, said hood unit being open at its lower end, said hood unit including a bearing member within its confines and spaced above its open end, the first support and the bearing member being adapted upon predetermined downward movement of the hood unit to apply sufficient pressure to the package to effect discharge of inert gas from the interior of the receptacle through any leaks that may exist in the receptacle, and means communicating with the interior of the hood unit for detecting the presence of nitrous oxide in gas admitted into the hood unit.

4. In apparatus for detecting leaks in the sealed receptacle of a package which includes a product and an inert gas comprising nitrous oxide that are contained in the receptacle, said receptacle comprising a flexible, deformable, fluid impermeable sheet material, the combination comprising support means including a first support and a second support, said package being adapted to be placed on the first support, a hood unit carried by the second support above the first support and movable upwardly and downwardly relative to the second support, said hood unit being open at its lower end, said hood unit including a bearing member within its confines and spaced above its open end, the first support coacting substantially simultaneously with the hood unit and the bearing member upon predetermined downward movement of the hood unit to respectively define a closed zone and apply sufficient pressure to the package to effect discharge of inert gas from the interior of the receptacle to the closed zone through any leaks that may exist in the receptacle, and means communicating with the closed zone for detecting the presence of nitrous oxide in the closed zone exterior of the receptacle.

5. Apparatus according to claim 4 wherein the bearing member comprises a perforate plate and wherein the hood unit also includes means for varying the distance between the plate and said open end of the hood unit.

6. Apparatus according to claim 4 including means responsive to operation of the last-mentioned means for flushing the interior of the hood unit with a gaseous composition that is devoid of nitrous oxide.

References Cited in the file of this patent

UNITED STATES PATENTS

| 1,538,369 | Akiyama | May 19, 1925 |
| 2,011,332 | Chapman | Aug. 13, 1935 |
| 2,834,686 | Reuman | May 13, 1958 |

OTHER REFERENCES

"Symposium on Non-Destructive Tests in the Field of Nuclear Energy," Pappin paper "Helium Leak Detection Techniques," Chicago, Apr. 16–18, 1957 (published 1958), Patent Office Scientific Library call number TK 9153, A52, pp. 328 and 332, Methods of Test, relied on.

"Nitrous Oxide for Leak Detection," publication of Ohio Chemical & Surgical Equipment Co., Madison 10, Wisconsin, Technical Information Series I.B., received U.S. Patent Office May 23, 1958 (Copy in Div. 36).